(12) United States Patent
Irino et al.

(10) Patent No.: US 9,964,146 B2
(45) Date of Patent: May 8, 2018

(54) MAGNETIC BEARING HAVING REDUCED LEAKAGE MAGNETIC FLUX

(71) Applicant: DAIKIN INDUSTRIES, LTD., Osaka-shi, Osaka (JP)

(72) Inventors: Yusuke Irino, Shiga (JP); Yuji Nakazawa, Plymouth, MN (US)

(73) Assignee: Daikin Industries, Ltd., Osaka (JP)

( * ) Notice: Subject to any disclaimer, the term of this patent is extended or adjusted under 35 U.S.C. 154(b) by 477 days.

(21) Appl. No.: 14/426,111

(22) PCT Filed: Aug. 26, 2013

(86) PCT No.: PCT/JP2013/005019
§ 371 (c)(1),
(2) Date: Mar. 4, 2015

(87) PCT Pub. No.: WO2014/041752
PCT Pub. Date: Mar. 20, 2014

(65) Prior Publication Data
US 2015/0233422 A1    Aug. 20, 2015

(30) Foreign Application Priority Data

Sep. 12, 2012 (JP) .................................. 2012-200719
Dec. 28, 2012 (JP) .................................. 2012-286884

(51) Int. Cl.
*F16C 32/04* (2006.01)
*H02K 7/09* (2006.01)

(52) U.S. Cl.
CPC ................................ *F16C 32/0461* (2013.01)

(58) Field of Classification Search
CPC ....... H02K 7/09; F16C 32/0461; F16C 32/04; F16C 32/0459; F16C 32/044; F16C 32/0406

(Continued)

(56) References Cited

U.S. PATENT DOCUMENTS

| 5,355,041 | A | 10/1994 | Shirao et al. |
| 6,194,800 | B1 * | 2/2001 | Maruyama .......... F16C 32/0459 310/90.5 |
| 6,563,244 | B1 * | 5/2003 | Yamauchi .......... F16C 32/0459 310/90.5 |

FOREIGN PATENT DOCUMENTS

| JP | 1047348 B | * 10/1989 | .......... F16C 32/0459 |
| JP | 5-280542 A | 10/1993 | |

(Continued)

OTHER PUBLICATIONS

Machine translation of JP 1047348 B (Oct. 1989).*
International Search Report issued in PCT/JP2013/005019, dated Nov. 26, 2013.

*Primary Examiner* — Michael Andrews
(74) *Attorney, Agent, or Firm* — Birch, Stewart, Kolasch & Birch, LLP (57) ABSTRACT

A magnetic bearing which would reduce a leakage magnetic flux to be generated between teeth is provided. A predetermined one of its teeth (24) is configured so that a pitch (P1) between the predetermined tooth (24) and one of two adjacent teeth (24) that are located on clockwise and counterclockwise sides thereof in the circumferential direction is broader than a pitch (P2) between the predetermined tooth (24) and the other tooth (24) and that a magnetic flux flows in the same radial direction through the predetermined tooth (24) and the tooth (24) spaced from the predetermined tooth (24) by the narrower pitch (P1) but flows in two different radial directions through the predetermined tooth (24) and the tooth (24) spaced from the predetermined tooth (24) by the broader pitch (P2).

12 Claims, 11 Drawing Sheets

(58) Field of Classification Search
USPC .......................................................... 310/90.5
See application file for complete search history.

(56) References Cited

FOREIGN PATENT DOCUMENTS

| | | |
|---|---|---|
| JP | 6-17830 A | 1/1994 |
| JP | 7-19244 A | 1/1995 |
| JP | 10-47348 A | 2/1998 |
| JP | 11-266564 A | 9/1999 |
| JP | 11-346457 A | 12/1999 |
| JP | 2001-41238 A | 2/2001 |

* cited by examiner

FIG.11

MAGNETIC BEARING HAVING REDUCED LEAKAGE MAGNETIC FLUX

TECHNICAL FIELD

The present invention relates to a magnetic bearing to support the rotating shaft with magnetic force.

BACKGROUND ART

A so-called "radial magnetic bearing" controls the radial position of the rotating shaft with magnetic force. Among various kinds of such magnetic bearings, a one in which a magnetic circuit is arranged within a plane that intersects at right angles with the rotating shaft is generally called a "heteropolar magnetic bearing". In some heteropolar magnetic bearings, a pair of magnetic poles, for example, may form one independent magnetic circuit to support the rotating shaft (see, for example, Patent Document 1). Since the supporting force generated by the magnetic bearing depends on the cross-sectional area of teeth located closer to the inner periphery of a stator core, those teeth suitably have a broad width.

CITATION LIST

Patent Document

[Patent Document 1] Japanese Unexamined Patent Publication No. 11-266564

SUMMARY OF INVENTION

Technical Problem

If the tooth width of the stator core is broadened, however, those teeth that form the magnetic circuit will be located even closer to each other, thus possibly generating a leakage magnetic flux between those teeth and causing a concern about some decrease in energy efficiency.

The present invention was perfected in order to overcome these problems, and one of its objects is to reduce such a leakage magnetic flux generated between teeth in a magnetic bearing.

Solution to the Problem

To overcome the problem described above, an implementation of the present invention is a magnetic bearing including:

a stator core (22) in which a plurality of teeth (24) are arranged in a circumferential direction so as to be located closer to an inner periphery than an annular back yoke (23) is and to face a rotating shaft (13); and coils (26) wound around the respective teeth (24), wherein a predetermined one of the teeth (24) is configured so that a pitch (P1) between the predetermined tooth (24) and one of two adjacent teeth (24) that are located on clockwise and counterclockwise sides thereof in the circumferential direction is broader than a pitch (P2) between the predetermined tooth (24) and the other tooth (24) and that a magnetic flux flows in the same radial direction through the predetermined tooth (24) and the tooth (24) spaced from the predetermined tooth (24) by the narrower pitch (P1) but in two different radial directions through the predetermined tooth (24) and the tooth (24) spaced from the predetermined tooth (24) by the broader pitch (P2).

According to this configuration, the pitch (P1) between the predetermined tooth (24) and one tooth (24), through which the magnetic flux flows in two different radial directions, is broader than the pitch (P2) between the predetermined tooth (24) and the other tooth (24), through which the magnetic flux flows in the same radial direction.

Advantages of the Invention

According to the present invention, the leakage magnetic flux that would be generated between the teeth can be reduced with the tooth width of the stator core kept broad enough. As a result, the energy efficiency will increase, the magnetic bearing can have its output density increased and its size reduced, and eventually, the overall cost can be cut down.

DESCRIPTION OF EMBODIMENTS

Embodiments of the present invention will now be described with reference to the accompanying drawings. It should be noted that the following description of embodiments is essentially intended to just show some examples of preferred embodiments of the present invention and is not intended to limit the scope of the present invention, its applications or its usage.

First Embodiment of this Invention

Overall Configuration

Figure 1:
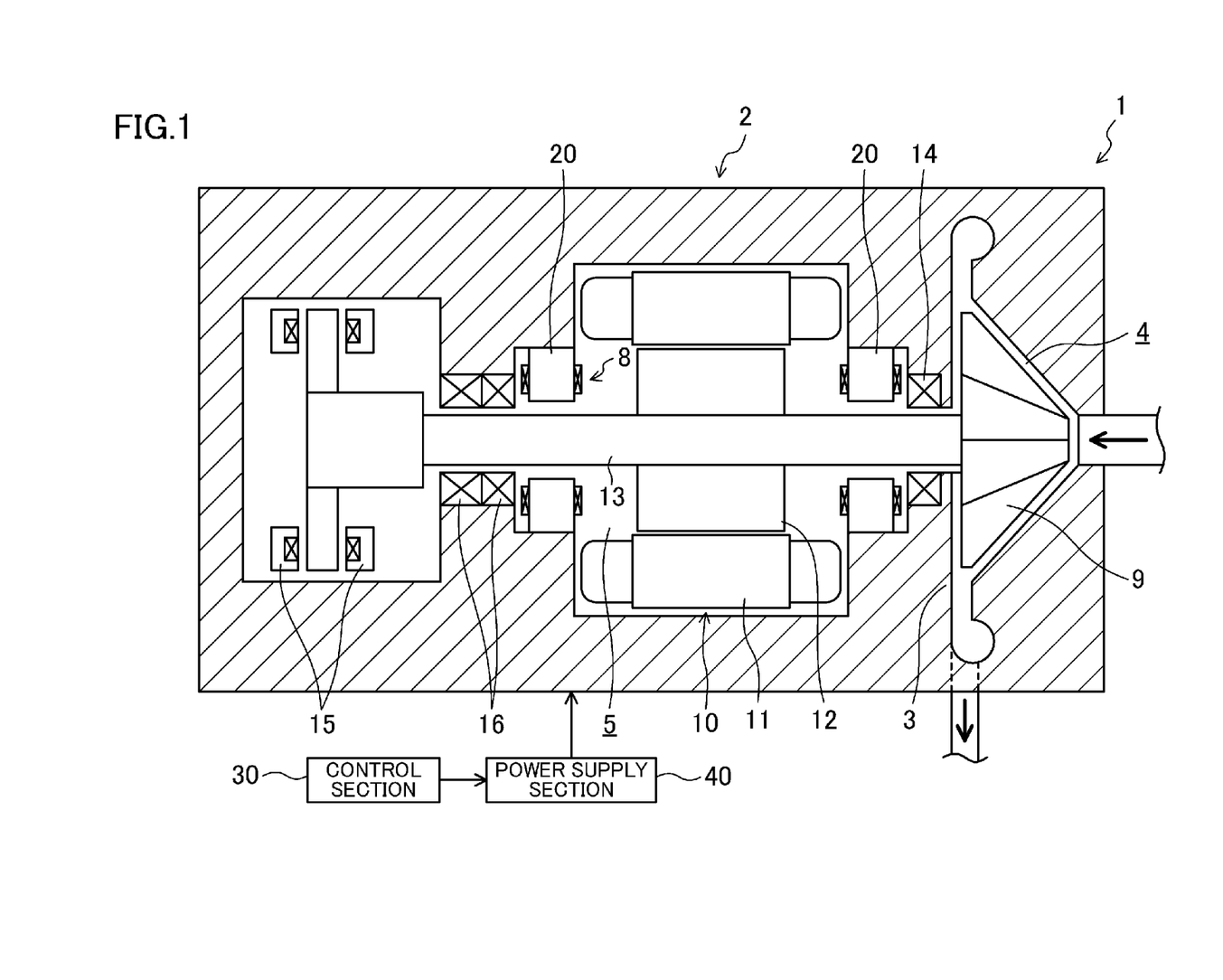
FIG. 1 illustrates generally the structure of a turbo compressor as a first embodiment.

A turbo compressor to which the magnetic bearing is applied will be described as an embodiment of the present invention. FIG. 1 illustrates generally the structure of a turbo compressor (1) as a first embodiment of the present invention. As shown in FIG. 1, the turbo compressor (1) includes a casing (2), an impeller (9), an electric motor (10), a control section (30) and a power supply section (40).

The casing (2) has been formed to have a circular cylindrical shape with closed ends and is arranged so that the axis of the circular cylinder runs horizontally. The space inside of the casing (2) is partitioned by a wall portion (3). Specifically, the space on the right-hand side of the wall portion (3) defines an impeller chamber (4) to house the impeller (9), while the space on the left-hand side of the wall portion (3) defines an electric motor space (5) to house the electric motor (10). The impeller (9) has a substantially circular cone profile formed by a plurality of blades. The impeller (9) is housed in the impeller chamber (4) so as to be fixed to one end of the drive shaft (13) (rotating shaft) of the electric motor (10).

The electric motor (10) is housed in the casing (2) and drives the impeller (9). In this example, the electric motor (10) is a so-called "permanent magnet synchronous motor". The electric motor (10) includes an electric motor stator (11), a rotor (12), the drive shaft (13) and a bearing mechanism (8). The electric motor stator (11) is fixed on the inner peripheral wall of the casing (2). The drive shaft (13) is secured to the rotor (12) so that its shaft center is coaxial with that of the rotor (12).

The bearing mechanism (8) includes a radial direction touchdown bearing (14), a thrust magnetic bearing (15), thrust direction and radial direction touchdown bearings (16) (which may be angular ball bearings, for example), and two magnetic bearings (20, 20).

As will be described in detail later, the magnetic bearings (20, 20) are provided with a plurality of electromagnets (25), and are configured to apply the synthetic electromagnetic force of the respective electromagnets (25) to the drive shaft (13) and to support the drive shaft (13) by a non-contact method. The radial direction touchdown bearing (14) may be implemented as ball bearings, for example, and supports the drive shaft (13) when the magnetic bearings (20) are not electrically conductive.

The power supply section (40) supplies electric power to the electromagnets (25). For example, a so-called "pulse width modulation (PWM) amplifier" may be adopted as the power supply section (40). The magnitude of the voltage supplied by the power supply section (40) to the electromagnets (25) is controlled by the control section (30). Using the detection value of a displacement sensor (to be described later) which detects the pitch between the magnetic bearings (20) and the drive shaft (13) (specifically, the displacement of the drive shaft (13)), the control section (30) performs a positioning control so that the drive shaft (13) is supported at any intended position in a non-contact manner. The control section (30) may be implemented as a combination of a microcomputer (not shown) and a program to operate the computer, for example.

Configuration of Magnetic Bearing

In the following description, the "axial direction" will refer herein to the direction in which the shaft center of the drive shaft (13) runs, and the "radial direction" will refer herein to the direction that intersects at right angles with the shaft center. Also, in the following description, if something is located closer to the outer periphery than something else is, it means that the former is located more distant from the shaft center than the latter is. On the other hand, if something is located closer to the inner periphery than something else is, it means that the former is located closer to the shaft center than the latter is.

Figure 2:
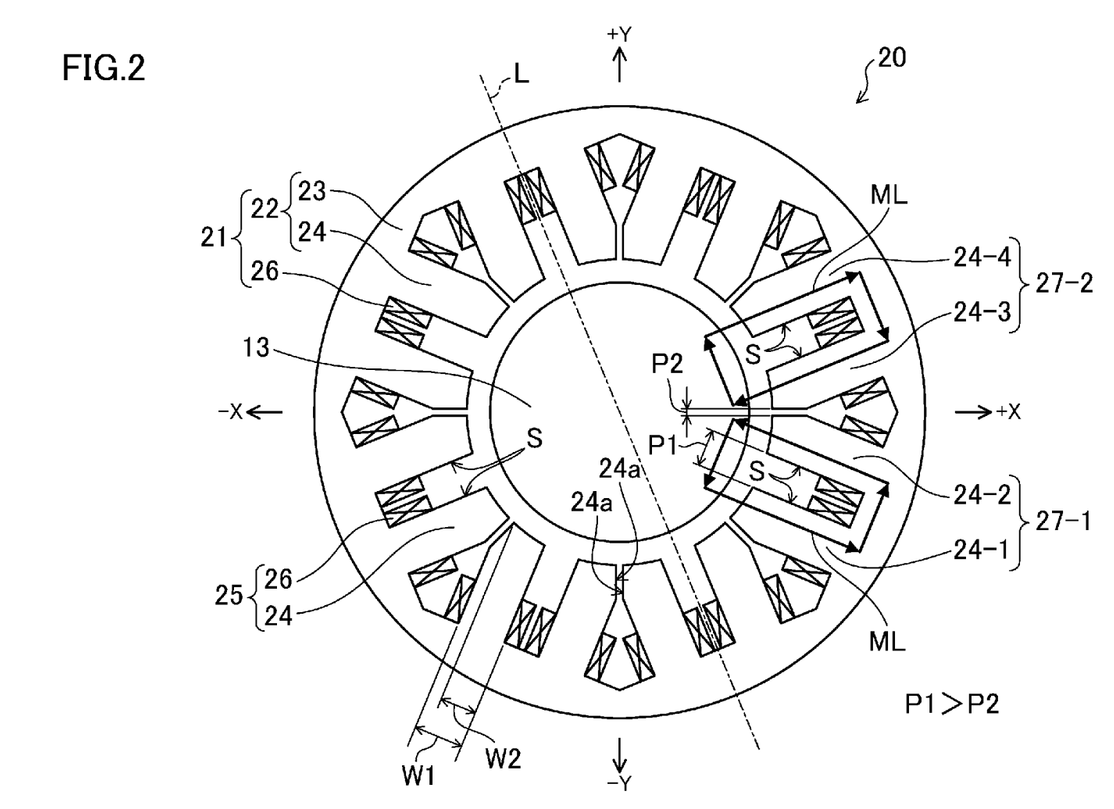
FIG. 2 is a lateral cross-sectional view of the magnetic bearing according to the first embodiment.
Figure 3:
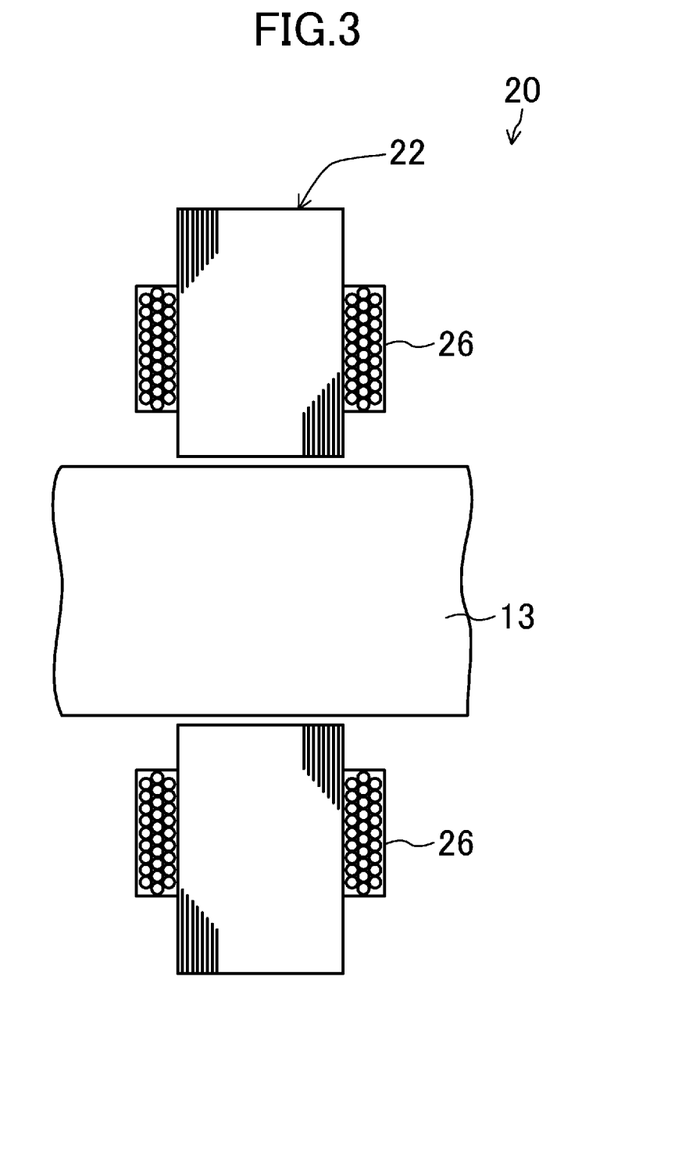
FIG. 3 is a longitudinal cross-sectional view of the magnetic bearing according to the first embodiment.

FIG. 2 is a lateral cross-sectional view of the magnetic bearing (20) according to the first embodiment. FIG. 3 is a longitudinal cross-sectional view of the magnetic bearing (20). The magnetic bearing (20) is a so-called "16-pole heteropolar radial magnetic bearing". The magnetic bearing (20) includes a stator (21) and displacement sensors (not shown).

The stator (21) includes a stator core (22) and a plurality of coils (26). The stator core (22) includes a back yoke (23) and a plurality of teeth (24), and may be formed by stacking a plurality of electrical steel sheets one upon the other, for example.

The back yoke (23) has been formed in an annular shape. Also, as shown in FIG. 2, the stator core (22) includes sixteen teeth (24). In FIG. 2, those teeth (24) and tooth pairs (27) to be described later each have a branch number (−1, −2 and so on) added as their suffix for the sake of convenience of description. Those teeth (24) form integral parts of the back yoke (23) and project from the inner peripheral surface of the back yoke (23) toward the inner periphery. Each of those teeth (24) has a generally rectangular parallelepiped shape and has a surface which is parallel to the shaft center (and which will be referred to herein as a "side surface (S)").

Those teeth (24) have uneven pitches at their tip end (i.e., the end that faces the drive shaft (13)). More specifically, in this stator (21), two teeth (24) form one pair (which will be referred to herein as a "tooth pair (27)") and are arranged so that their side surfaces (S) are parallel to each other. Also, two adjacent tooth pairs (27) are arranged so that the two teeth (24) facing each other between those two pairs form a V shape with an open outer peripheral end.

Such a configuration will be described more specifically with reference to FIG. 2. For example, the teeth (24-1 and 24-2) form one tooth pair (27-1), and the teeth (24-3 and 24-4) form another tooth pair (27-2). The side surface (S) of the tooth (24-1) is parallel to the side surface (S) of the tooth (24-2). Likewise, the side surface (S) of the tooth (24-3) is also parallel to the side surface (S) of the tooth (24-4). Furthermore, the teeth (24-2 and 24-3) are arranged so as to form a V shape with an open outer peripheral end. And these tooth pairs (27) are arranged closer to the inner periphery than the back yoke (23) is so that their center lines (L) form even-pitch angles between themselves. In this description, the center line (L) refers herein to a line that connects the middle of the pitch between two teeth (24) that form each tooth pair (27) to the shaft center of the stator core (22).

In this configuration, these teeth (24) are arranged so that the pitch (P1) between the two teeth (24) that form one tooth pair (27) is broader than the pitch (P2) between the two teeth (24) that face each other in two adjacent tooth pairs (27). In FIG. 2, for example, the pitch (P1) between the teeth (24-1 and 24-2) is broader than the pitch (P2) between the teeth (24-2 and 24-3).

Each of these teeth (24) has a notched portion (24a) at its tip end that faces the adjacent tooth pair (27). By providing this notched portion (24a), the pitch between two adjacent tooth pairs (27) can be narrowed, and the pitch (P1) between two teeth (24) that form each tooth pair (27) can be kept sufficiently broad (as will be described later). Naturally, the width of each tooth (24) at its tip end is set to be at least as broad as a predetermined width so as to avoid causing magnetic saturation and other kinds of inconveniences. By providing this notched portion (24a), the circumferential width (W1) of an outer peripheral portion of each tooth (24) becomes broader than the circumferential width (W2) of its innermost peripheral portion as measured at its tip end.

A winding wire member (such as a coated copper wire) is wound around each tooth (24) to form a coil (26) there. As a result, an electromagnet (25) is formed at each tooth (24). The winding wire member may be wound through a winding nozzle, for example. In this magnetic bearing (20), the coils (26) are wound around each pair of adjacent teeth (24) in mutually opposite directions. It should be noted that since two teeth (24) that form each tooth pair (27) are arranged parallel to each other, the winding wire members can be easily wound around them.

This magnetic bearing (20) is configured to make two tooth pairs (27) (i.e., four teeth (24) in total) control force in one direction. In the example shown in FIG. 2, the magnetic bearing (20) makes the two tooth pairs (27-1 and 27-2) generate magnetic attraction in the +X direction (i.e., the rightward direction in FIG. 2), thereby controlling the position of the drive shaft (13) in that direction. To realize that, in this magnetic bearing (20), the respective coils (26) of the four teeth (24-1, 24-2, 24-3 and 24-4) that form these two tooth pairs (27-1 and 27-2) are connected in series together. And the coils (26) that are connected in series are further connected to a power supply section (40) to get power supplied from the power supply section (40). Alternatively, these four teeth (24-1, 24-2, 24-3 and 24-4) may also be used by being connected in parallel with each other.

When electric current is allowed to flow through the respective coils (26) that form the two tooth pairs (27-1 and 27-2), magnetic circuits, of which the magnetic flux directions are as indicated by the solid arrows in FIG. 2 (and which will be referred to herein as "magnetic loops (ML)"), are formed. That is to say, one magnetic loop (ML) is formed by the tooth (24-1), drive shaft (13), tooth (24-2) and back yoke (23), and another magnetic loop (ML) is formed by the tooth (24-3), drive shaft (13), tooth (24-2) and back yoke (23).

As described above, in this embodiment, each tooth (24) is configured so that the pitch (P1) between that tooth (24) and one of two adjacent teeth (24) that are located on clockwise and counterclockwise sides thereof in the circumferential direction is broader than the pitch (P2) between that tooth (24) and the other tooth (24) and that a magnetic flux flows in the same radial direction through that tooth (24) and the tooth (24) spaced from that tooth (24) by the narrower pitch (P1) but flows in two different radial directions through that tooth (24) and the tooth (24) spaced from that tooth (24) by the broader pitch (P2). It should be noted that in two teeth (24) which are adjacent to each other and through which a magnetic flux flows in mutually different radial directions, the coils (26) are wound around them the same number of times.

Leakage Magnetic Flux Generated by Teeth

In a magnetic bearing in which teeth are arranged at even pitches (and which will be referred to herein as a "conventional magnetic bearing" for the sake of convenience of description), the broader the tooth width of its stator core, the narrower the pitch between their teeth. For that reason, if the tooth width is increased in the conventional magnetic bearing, there will be concern about a leakage magnetic flux.

In contrast, according to this embodiment, by narrowing the pitch (P2) between two teeth (24) through which a magnetic flux flows in the same radial direction, a broader pitch can be defined between teeth (24) that form a magnetic loop (ML) (i.e., between teeth (24) through which a magnetic flux flows in mutually different radial directions) than in the conventional magnetic bearing. Consequently, according to this embodiment, the leakage magnetic flux that would be generated between teeth (24) can be reduced with the tooth width broadened. As for teeth (24) through which a magnetic flux flows in the same radial direction, on the other hand, even if the pitch (P2) is narrowed, the leakage magnetic flux would not be a problem.

Effects Achieved by this Embodiment

As described above, according to this embodiment, the leakage magnetic flux that would be generated between teeth (24) can be reduced, and therefore, the magnetic bearing (20) can achieve increased energy efficiency. As a result, the size of the magnetic bearing (20) can be reduced, and eventually, the overall cost can be cut down.

In addition, since the circumferential width (W1) of an outer peripheral portion of each tooth (24) is broader than the circumferential width (W2) of the innermost peripheral portion thereof, magnetic saturation will not be caused easily on the outer peripheral portion of the tooth (24). The leakage magnetic flux that would be generated between the teeth (24) can also be reduced for this reason, too.

On top of that, by arranging the teeth (24) at uneven pitches as described above, the strength of the magnetic flux can be increased, too.

Second Embodiment of this Invention

Figure 4:
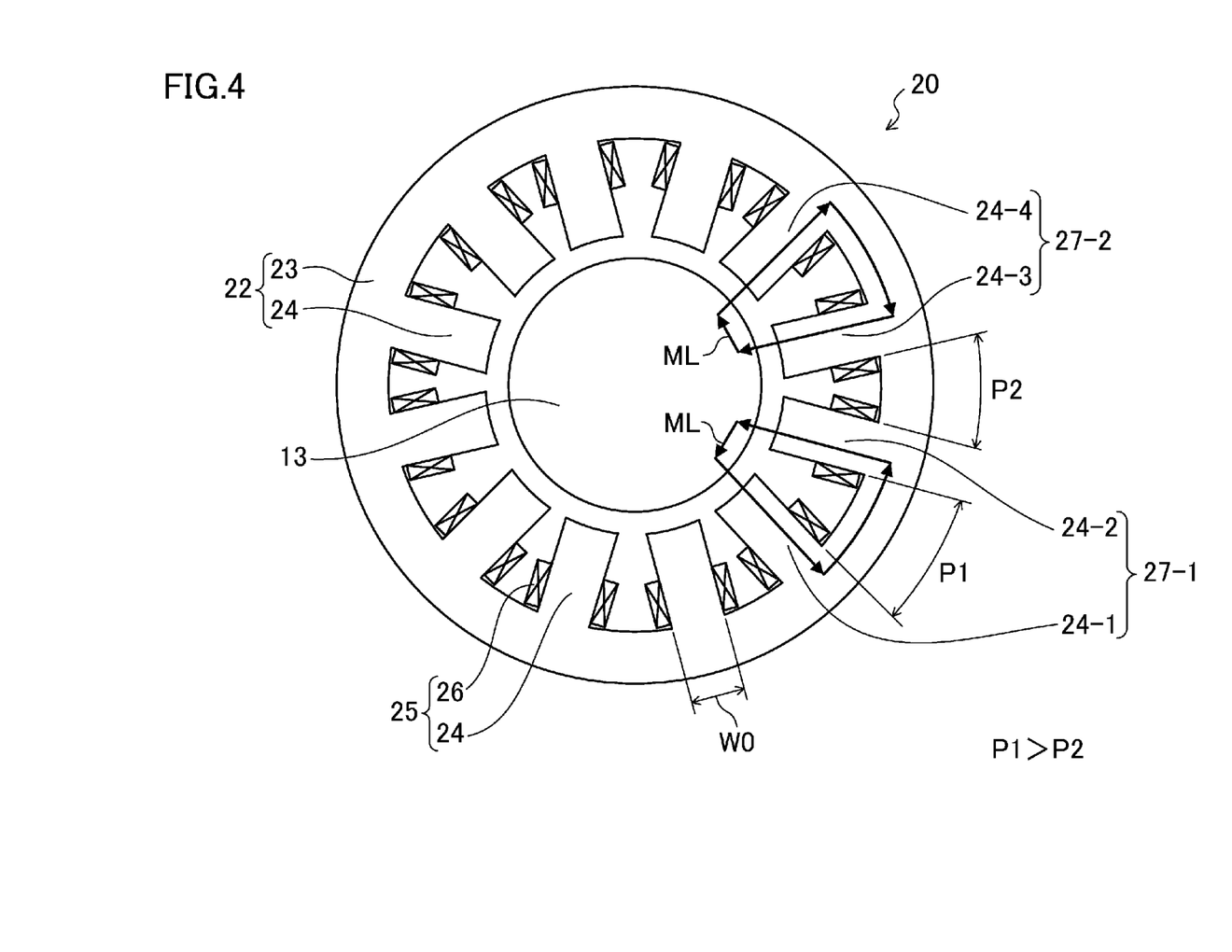
FIG. 4 is a lateral cross-sectional view of a magnetic bearing according to a second embodiment.

FIG. 4 is a lateral cross-sectional view of a magnetic bearing (20) as a second embodiment of the present invention. As shown in FIG. 4, twelve teeth (24) are provided for the stator core (22). That is to say, the number of the magnetic poles provided for the magnetic bearing (20) does not have to be sixteen as in the example described above. In this example, each tooth (24) is also configured so that the pitch (P1) between that tooth (24) and one of the two adjacent teeth (24) that are located on clockwise and counterclockwise sides in the circumferential direction is broader than the pitch (P2) between that tooth (24) and the other tooth (24). However, in this example, the circumferential width (W0) of an outer peripheral portion of each tooth (24) is as broad as that (W0) of the innermost peripheral portion thereof.

In this example, the coils (26) are also wound around each pair of adjacent teeth (24) in mutually opposite directions. And electric current is also allowed to flow through the coils (26) so that the magnetic flux flows in the same radial direction through each tooth (24) and the one tooth (24) spaced from that tooth (24) by the narrower pitch (P1) but flows in mutually different radial directions through each tooth (24) and the other tooth (24) spaced from that tooth (24) by the broader pitch (P2).

As can be seen from the foregoing description, even in such a magnetic bearing (20) with twelve magnetic poles, by narrowing the pitch (P2) between two teeth (24) through which a magnetic flux flows in the same radial direction, a broader pitch can be defined between teeth (24) that form a magnetic loop (ML) (i.e., between teeth (24) through which a magnetic flux flows in mutually different radial directions) than in the conventional magnetic bearing. Consequently, according to this embodiment, the leakage magnetic flux that would be generated between teeth (24) can also be reduced.

Optionally, if the circumferential width of an outer peripheral portion of each tooth (24) is set in this embodiment to be broader than the circumferential width of the innermost peripheral portion thereof, magnetic saturation will be caused much less easily in the outer peripheral portion of the tooth (24).

Third Embodiment of this Invention

Figure 5:
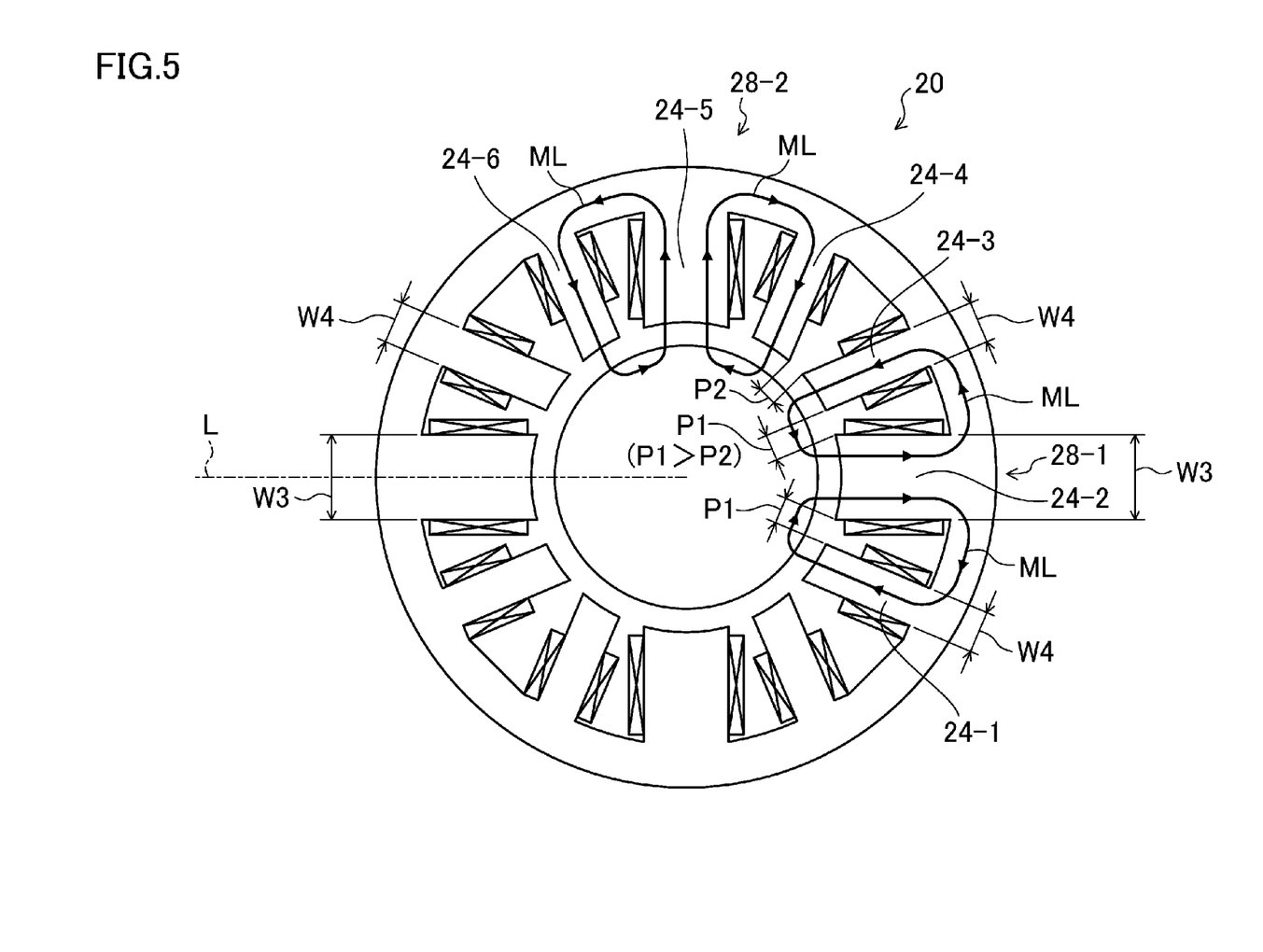
FIG. 5 is a lateral cross-sectional view of a magnetic bearing according to a third embodiment.

FIG. 5 is a lateral cross-sectional view of a magnetic bearing (20) as a third embodiment of the present invention.

As shown in FIG. 5, twelve teeth (24) are provided for the stator core (22). In this embodiment, three teeth (24) form one group (which will be referred to herein as a "tooth group (28)"), and the middle one of the teeth (24) in each tooth group (28) forms one magnetic loop (ML) with one of the two other teeth (24) that are located on clockwise and counterclockwise sides in the circumferential direction, and also forms another magnetic loop (ML) with the other tooth (24). Specifically, as shown in FIG. 5, a set of three teeth (24-1, 24-2 and 24-3) forms one tooth group (28-1), and another set of three teeth (24-4, 24-5 and 24-6) forms another tooth group (28-2). The coils (26) of the three teeth (24) that form each tooth group (28) are connected in series together. And the coils (26) that are connected in series are further connected to a power supply section (40) to get power supplied from the power supply section (40). Naturally, these three teeth (24) may also be used by being connected in parallel with each other.

Among the three teeth (24) that form each tooth group (28), the circumferential width (W3) of the innermost peripheral portion of the middle tooth (24) is set to be broader than the circumferential width (W4) of the innermost peripheral portion of the other two teeth (24) located on the clockwise and counterclockwise sides of the middle tooth (24). And these tooth groups (28) are arranged closer to the inner periphery than the back yoke (23) is so that their middle teeth (24) form even-pitch angles between themselves. Also, in this example, the pitch (P1) between two adjacent ones of the teeth (24) in each tooth group (28) is set to be broader than the pitch (P2) between two teeth (24) that face each other in two adjacent tooth groups (28).

Such a configuration will be described more specifically with reference to FIG. 5. For example, within the tooth group (28-1), the circumferential width (W3) of the innermost peripheral portion of the middle tooth (24-2) is set to be broader than the circumferential width (W4) of the innermost peripheral portion of the other two teeth (24-1 and 24-3) located on the clockwise and counterclockwise sides of the middle tooth (24-1). In FIG. 5, within the tooth group (28-1), for example, the pitch (P1) between the teeth (24-1 and 24-2) is as broad as the pitch (P1) between the teeth (24-2 and 24-3). On the other hand, the pitch (P2) between the teeth (24-3 and 24-4) belonging to two different tooth groups (28-1 and 28-2) and facing each other is narrower than the pitch (P1) between the teeth (24) in the tooth group (28-1).

When electric current is allowed to flow through the respective coils (26) that form the two tooth groups (28-1 and 28-2), magnetic loops (ML), of which the magnetic flux directions are as indicated by the solid arrows in FIG. 5, are formed. In the tooth group (28-1), for example, one magnetic loop (ML) is formed by the tooth (24-1), drive shaft (13), tooth (24-2) and back yoke (23), and another magnetic loop (ML) is formed by the tooth (24-2), drive shaft (13), tooth (24-3) and back yoke (23). Likewise, two magnetic loops (ML) are also formed in the tooth group (28-2). Meanwhile, the magnetic flux flows in the same radial direction through the tooth (24-3) and the tooth (24-4) belonging to a different group from the tooth (24-3).

As described above, according to this embodiment, a predetermined tooth (24) is configured so that the pitch (P1) between the predetermined tooth (24) and one of the two adjacent teeth (24) that are located on clockwise and counterclockwise sides thereof in the circumferential direction and that belong to the same group as the predetermined tooth (24) is broader than the pitch (P2) between the predetermined tooth (24) and an adjacent tooth (24) belonging to a different group. The predetermined tooth (24) forms a magnetic loop (ML) along with the (middle) tooth (24) in the same group, drive shaft (13), and back yoke (23). And the magnetic flux flows in the same radial direction through the predetermined tooth (24) and the adjacent tooth (24) belonging to the different group.

As can be seen, even if a tooth group (28) is formed by three teeth (24), by narrowing the pitch (P2) between two teeth (24) through which a magnetic flux flows in the same radial direction, a broader pitch can be defined between teeth (24) that form a magnetic loop (ML) than in the conventional magnetic bearing. Consequently, according to this embodiment, the leakage magnetic flux that would be generated between teeth (24) can also be reduced.

Fourth Embodiment of this Invention

Figure 6:
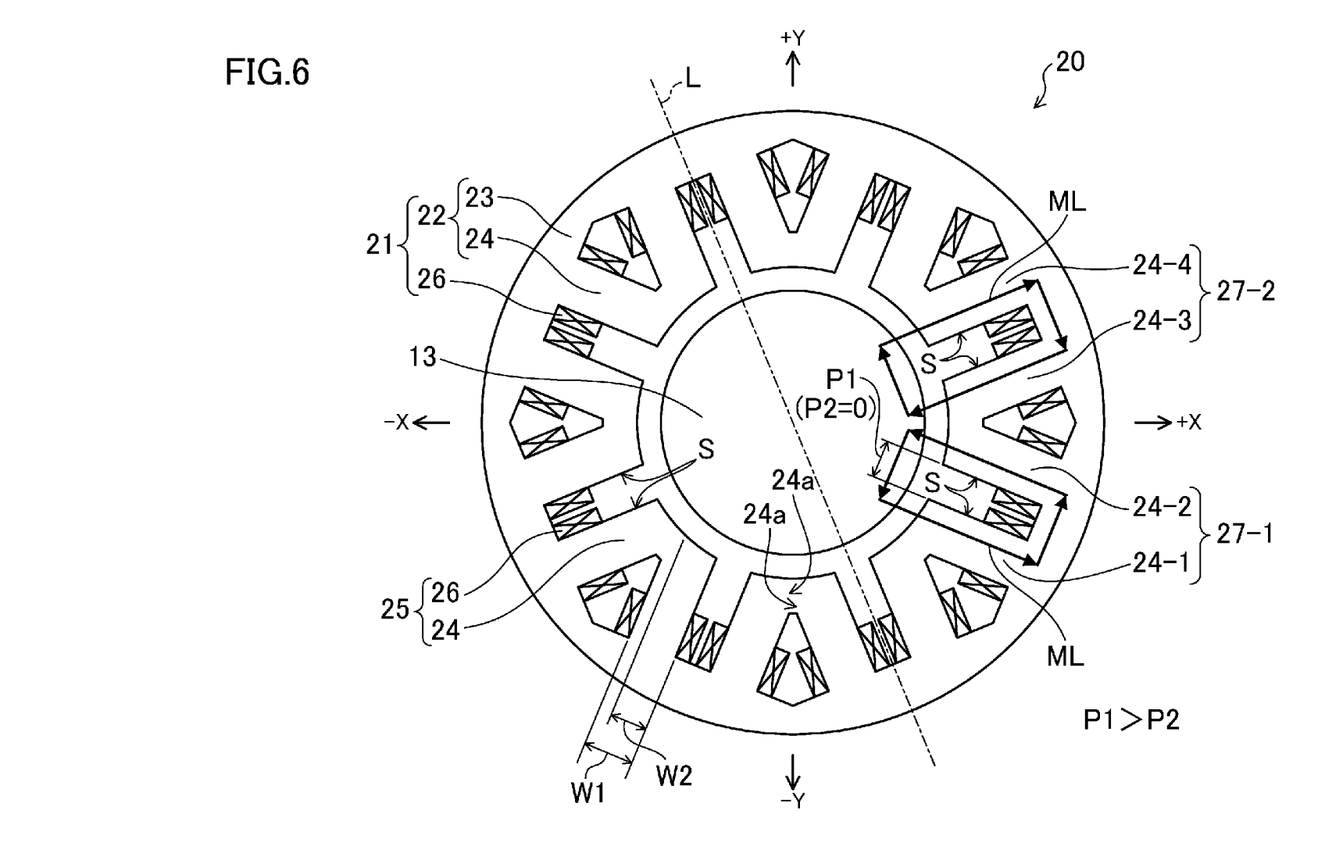
FIG. 6 is a lateral cross-sectional view of a magnetic bearing according to a fourth embodiment.

FIG. 6 is a lateral cross-sectional view of a magnetic bearing (20) as a fourth embodiment of the present invention. This embodiment is a modification to the configuration of the magnetic bearing (20) of the first embodiment. Specifically, in this embodiment, the stator core (22) is configured so that the two teeth (24) which are adjacent to each other and through which the magnetic flux flows in the same radial direction have their inner peripheral ends brought into contact with each other. In the example illustrated in FIG. 6, the respective tip ends of the teeth (24-2 and 24-3) are in contact with each other. More specifically, two teeth (24), through which the magnetic flux flows in the same radial direction, have been formed integrally (i.e., so that P1 is equal to zero). That is to say, according to the present invention, the teeth (24) are coil (26) based units. Thus, the "pitch" between some teeth (24) could be equal to zero in some cases and is a concept that should be broadly construed as such.

Fifth Embodiment of this Invention

Figure 7:
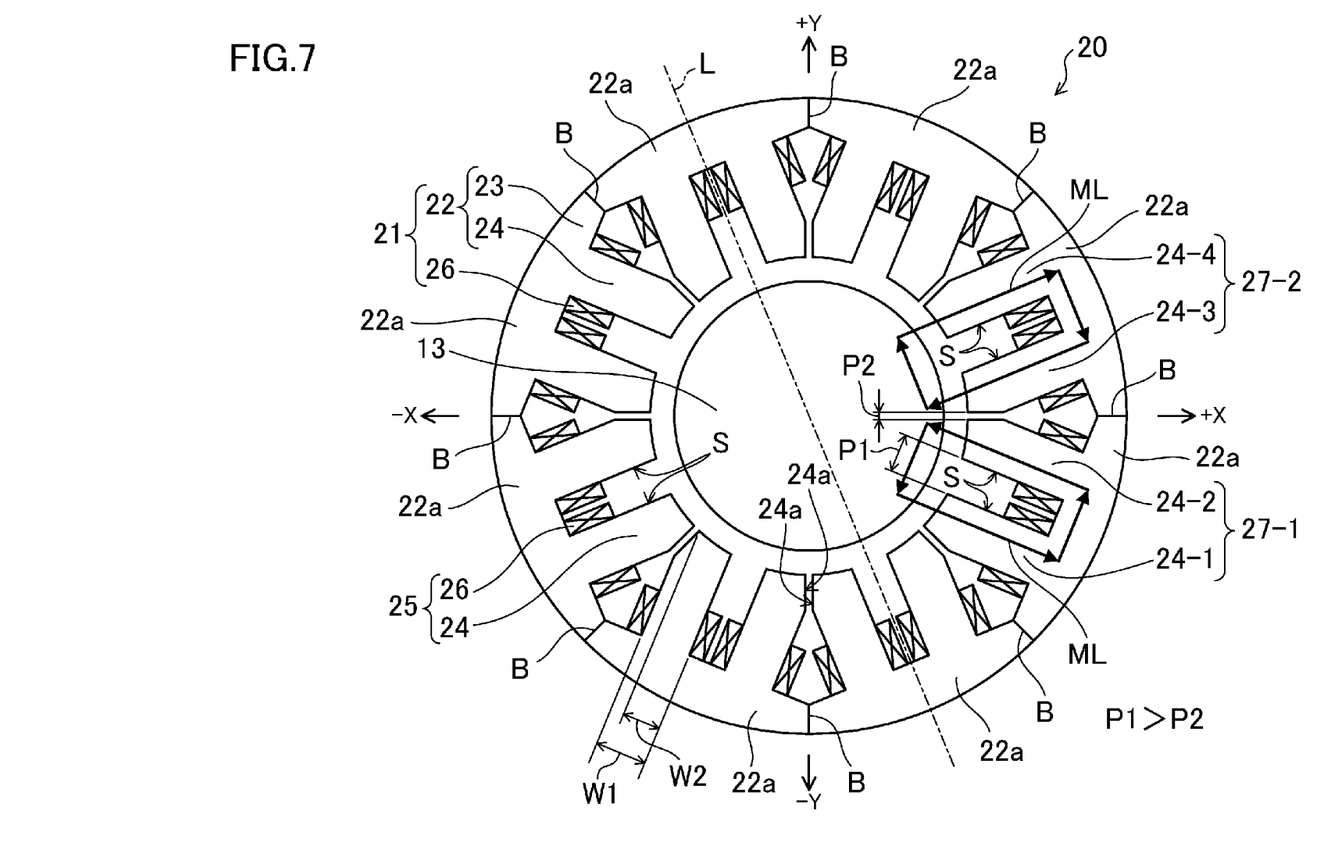
FIG. 7 is a lateral cross-sectional view of a magnetic bearing according to a fifth embodiment.

FIG. 7 is a lateral cross-sectional view of a magnetic bearing (20) as a fifth embodiment of the present invention. In the example illustrated in FIG. 7, the magnetic bearing (20) has sixteen poles. In this embodiment, the stator core (22) is comprised of eight core blocks (22a) which have been coupled together so that their boundary is defined by a portion of the back yoke (23). More specifically, as shown in FIG. 7, those core blocks (22a) are arranged so that their boundary (B) is defined between two teeth (24) through which the magnetic flux flows in the same radial direction, i.e., extends through the narrower gap between those teeth (24). Therefore, it follows that each core block (22a) includes one tooth pair (27).

According to this embodiment, after the coils (26) have been wound on a core block (22a) basis, those core blocks (22a) can be coupled together. Those core blocks (22a) may be coupled together by welding (e.g., laser welding), for example. Also, since the stator core (22) has been divided into such core blocks (22a), the coils (26) may be wound by any of various assembling techniques. For example, the coil (26) can be wound around each tooth (24) by winding a winding wire member around a spool bobbin (not shown) in advance and then fitting the bobbin into the tooth (24) of each core block (22a). As can be seen, by using such a stator core (22) comprised of multiple separate core blocks (22a), the coil (26) can be easily wound around a tooth (24) even if only a narrow gap is left beside the tip end of the tooth (24).

It should be noted that the stator core (22) does not always have to be divided at such positions (i.e., the location of the boundary (B) between those core blocks (22a) is just an example). Naturally, the boundary (B) may also be located between teeth (24) that form a magnetic loop (ML), i.e., so as to extend through the broader gap between them.

Sixth Embodiment of this Invention

Figure 8:
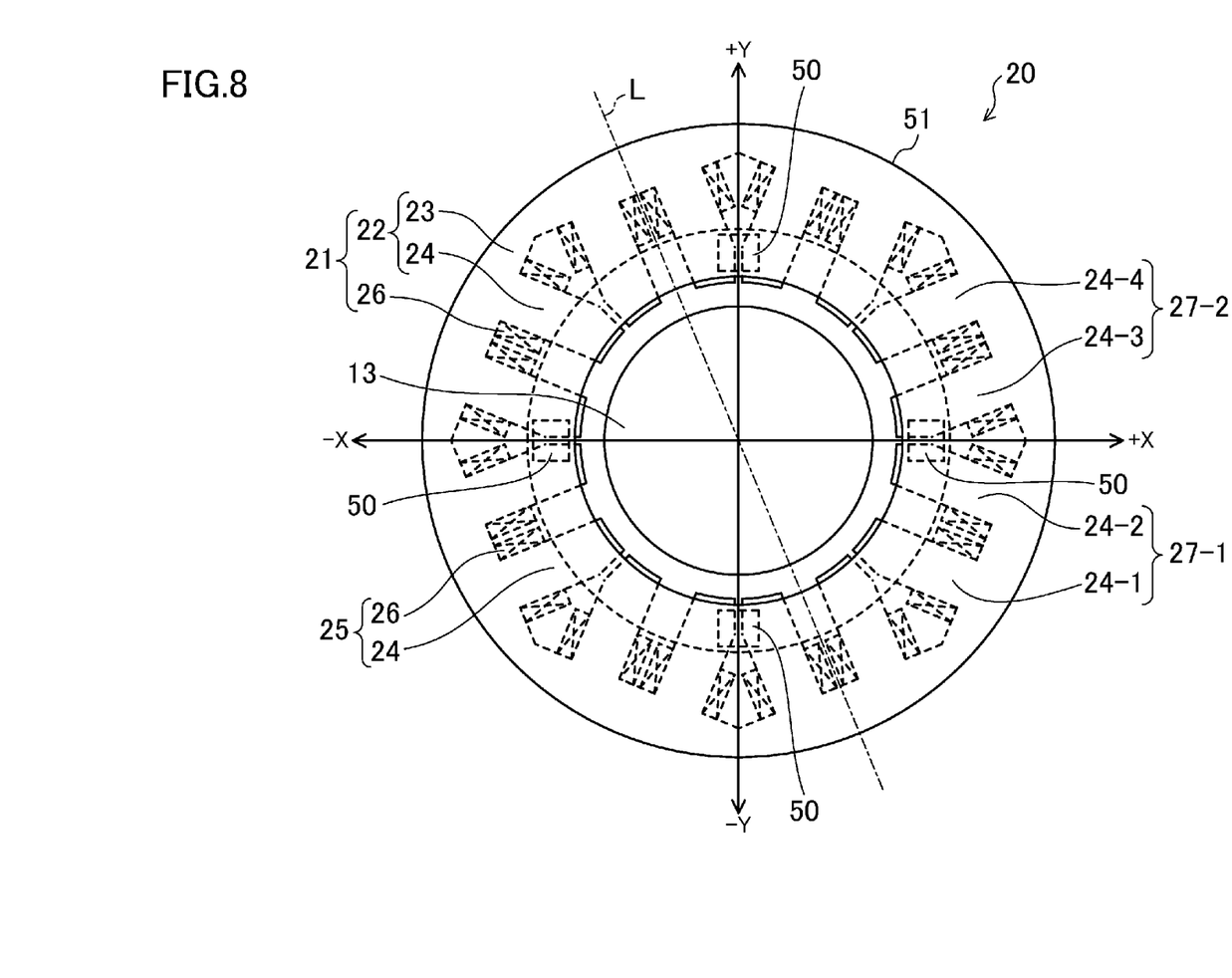
FIG. 8 is a lateral cross-sectional view illustrating exemplary positions where displacement sensors are attached.
Figure 9:
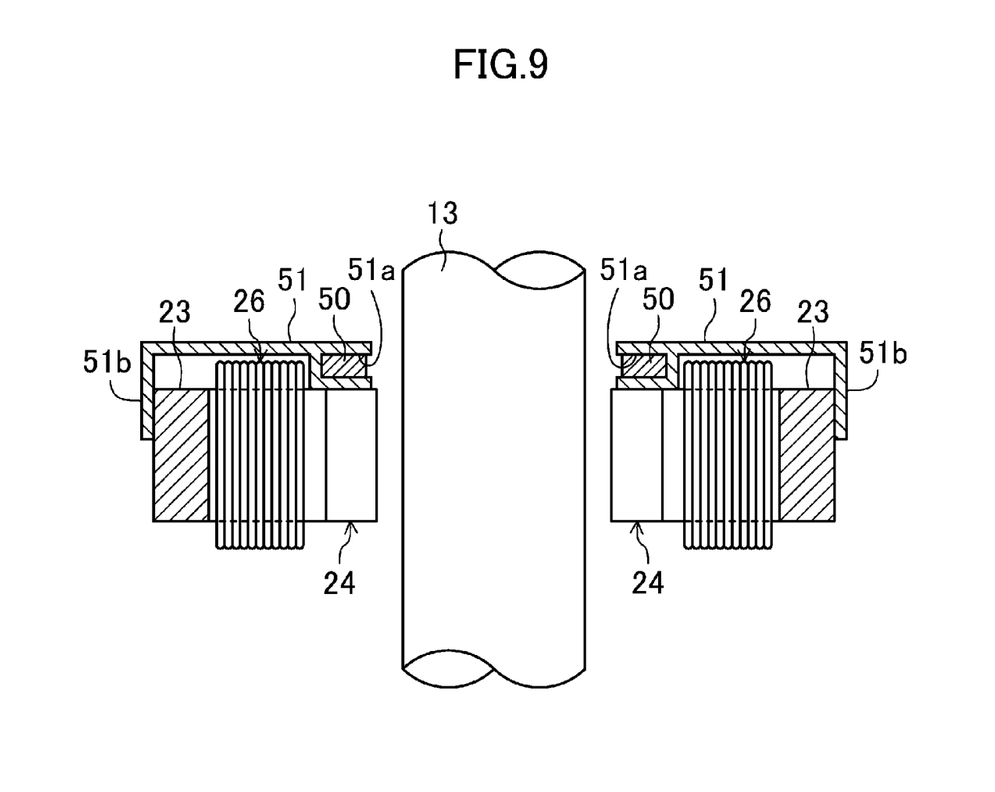
FIG. 9 is a longitudinal cross-sectional view illustrating exemplary positions where the displacement sensors are attached.

A structure for attaching displacement sensors to sense the displacement of the rotating shaft (13) will be described as a sixth embodiment of the present invention. FIG. 8 is a lateral cross-sectional view illustrating exemplary positions where the displacement sensors (50) are attached. FIG. 9 is a longitudinal cross-sectional view illustrating exemplary positions where the displacement sensors (50) are attached.

As already described for embodiments, if respective tip ends of the teeth (24) are located close to each other, there is only a narrow coil (26) winding space left around the tip ends. For that reason, in the embodiments described above, the coils (26) tend to be wound around the teeth (24) in the vicinity of the back yoke (23). As a result, a vacant space is created on the end face of the tip end of each tooth (24) as viewed in the axial direction. In this embodiment, each displacement sensor (50) is arranged closer to the inner periphery than the coils (26) are so as to overlap with the axial end face of the tip end portion of its associated tooth (24) as shown in FIGS. 8 and 9 when viewed in an axial direction. The type of the displacement sensor (50) to use is not particularly limited. But in this embodiment, an eddy current type displacement sensor may be adopted as an example.

In the magnetic bearing (20) of each embodiment, the control section (30) controls the positions of the drive shaft (13) in the X- and Y-axis directions shown in FIG. 8 using the detection values of the displacement sensors (50). In this example, two displacement sensors (50) are arranged along each of the X- and Y-axes as shown in FIG. 8. By providing the displacement sensors (50) in this manner on the axes of positioning control, each of those displacement sensors (50) is arranged so as to overlap with two teeth (24). For example, the displacement sensor (50) arranged on the positive side of the X axis overlaps with two teeth (24-2 and 24-3). Also, each displacement sensor (50) is fixed with a ringlike base member (51). As shown in FIG. 9, the base member (51) has a ring groove (51a) to house the displacement sensor (50) and is fixed on the outer periphery of the stator core (22) with a circular cylindrical wall (51b) located on the outer periphery.

Effects Achieved by this Embodiment

In a general magnetic bearing, the displacement sensor is often mounted on a coil end with some base member (such an arrangement will be referred to herein as a "conventional arrangement") interposed between them. In contrast, according to this embodiment, each displacement sensor (50) can be mounted on the end faces of the tip ends of its associated teeth (24) as viewed in the axial direction. As a result, the overall axial length of the magnetic bearing (20) can be reduced compared to the conventional arrangement.

In addition, according to this embodiment, the displacement sensors (50) can be mounted closer to the inner periphery than the coils (26) are, and therefore, can be arranged closer to the drive shaft (13). As a result, the displacement sensors (50) are arranged closer to the point of application of force, and the positioning control can be carried out more accurately.

Furthermore, according to this embodiment, the displacement sensors (50) are arranged on the axes of positioning control (i.e., on the X- and Y-axes). That is why in performing the positioning control, the detection values of the displacement sensors (50) may be used as they are without being subjected to coordinate transformation or any other kind of transformation. As a result, the computations to get done by the control section (30) for the purpose of positioning control can be simplified and a less expensive microcomputer may be adopted as the control section (30).

Figure 10:
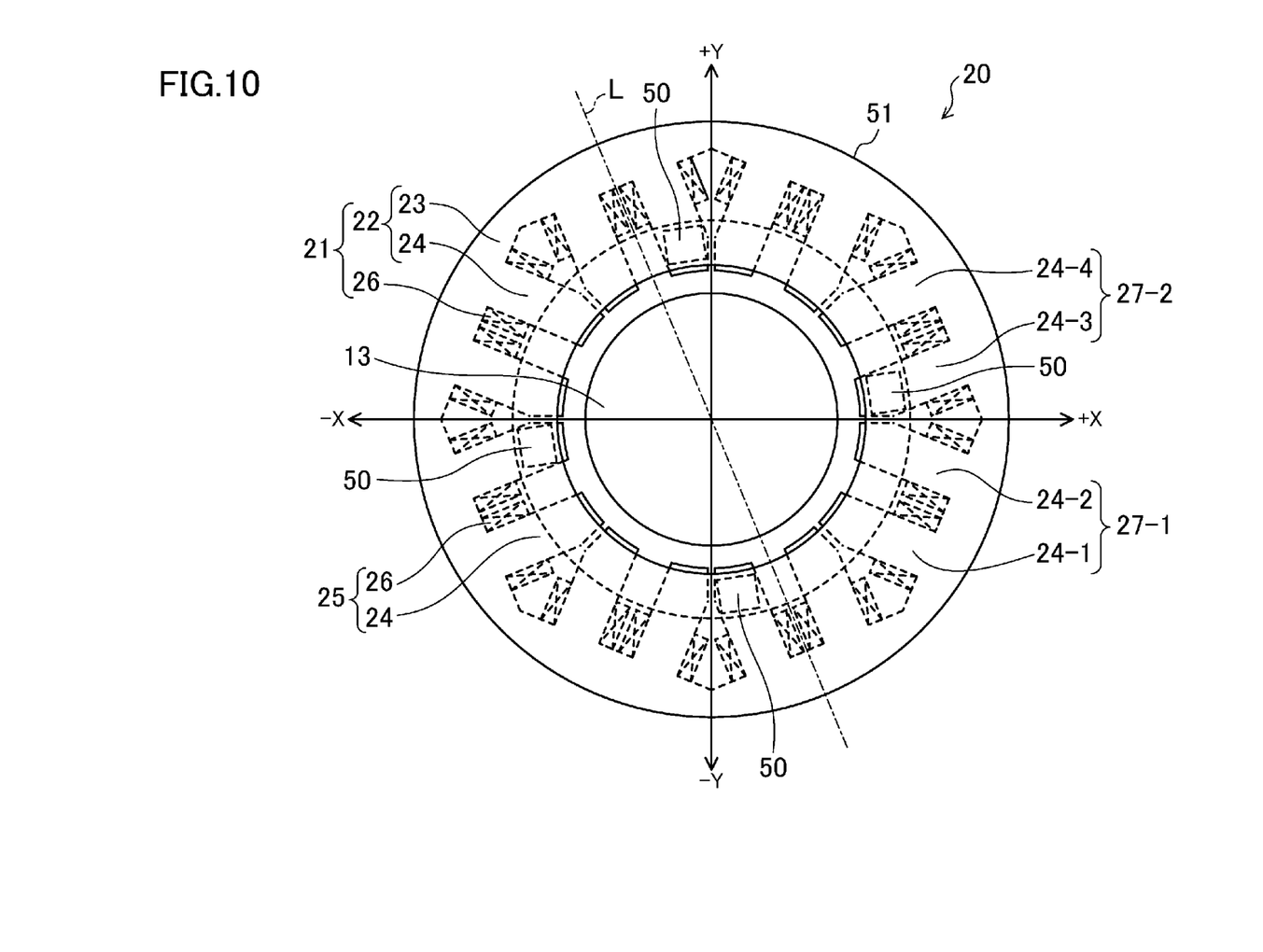
FIG. 10 is a lateral cross-sectional view illustrating another exemplary arrangement of the displacement sensors.

Naturally, however, the displacement sensors (50) do not always have to be arranged on the axes of positioning control. FIG. 10 illustrates another exemplary arrangement of the displacement sensors (50). In the example shown in FIG. 10, the displacement sensors (50) are arranged right over some teeth (24). In that case, the displacement sensors (50) are not aligned with the axes of control.

Seventh Embodiment of this Invention

Figure 11:
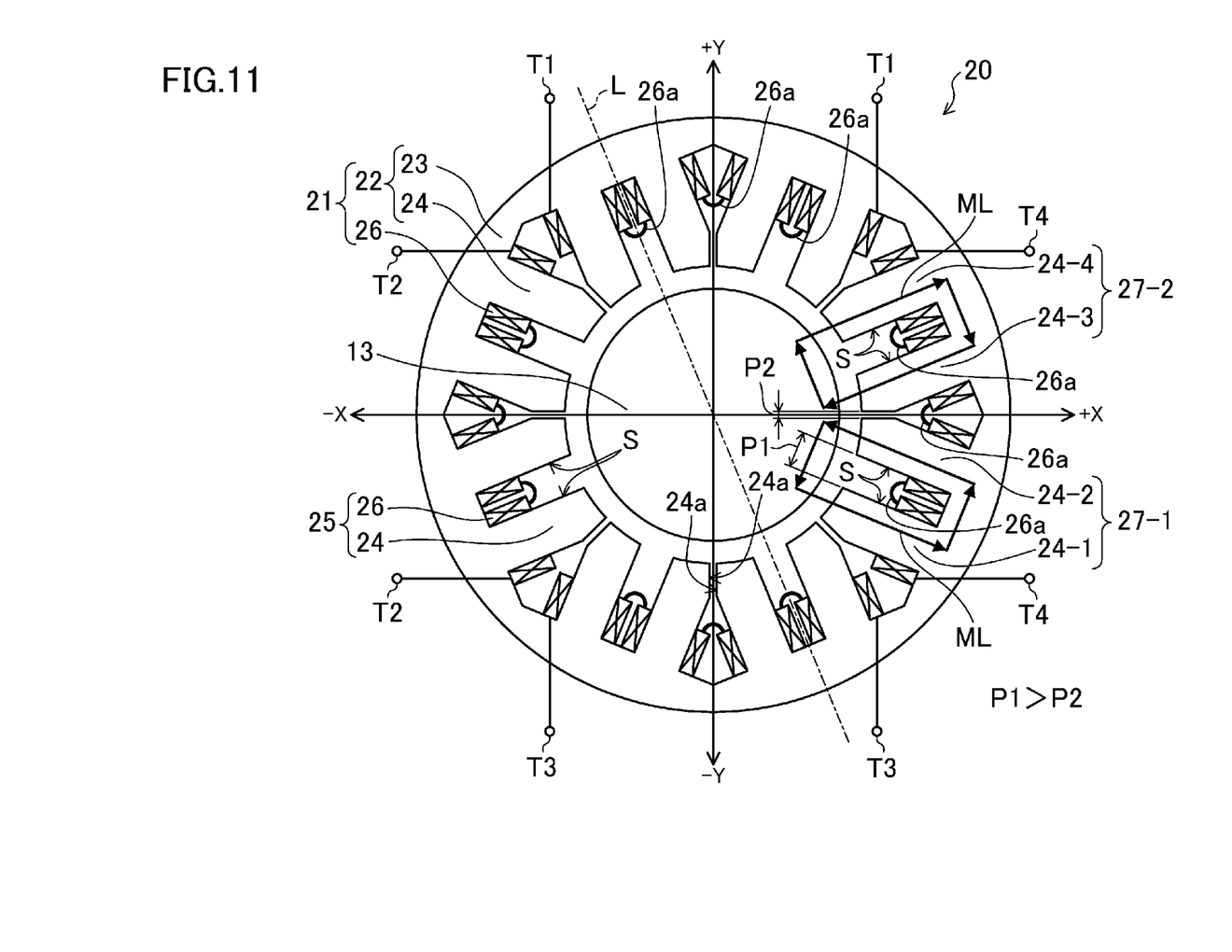
FIG. 11 illustrates how coils may be connected together.

Next, it will be described as a seventh embodiment of the present invention how to connect the coils (26) together. FIG. 11 illustrates how the coils (26) may be connected together. As already described for the first embodiment, in the magnetic bearing (20), the coils (26) are connected in series together on a four-by-four basis. In the example illustrated in FIG. 11, the coils (26) of the teeth (24-1, 24-2, 24-3 and 24-4) are connected in series together. As a result, the electromagnet (25) formed by these four teeth (24-1, 24-2, 24-3 and 24-4) generates magnetic attraction in the +X direction using the four teeth (24) as a single set. In FIG. 11, the reference signs T1, T2, T3 and T4 denote terminals to supply electric power to those coils (26) that are connected in series together. These terminals (T1, T2, T3, and T4) are connected to the power supply section (40).

Also, in this example, wiring portions (26a) between the coils (26) are arranged on the end faces of the respective tip ends of the teeth (24) as viewed in the axial direction so as to be located closer to the inner periphery than the coils (26) are. In a general magnetic bearing, coils are often wired together somewhere close to the outer periphery (such an arrangement will be referred to herein as a "conventional arrangement"). In contrast, according to this embodiment, a vacant space is created on the end face of the tip end of each tooth (24) as viewed in the axial direction, and therefore, the wiring portions (26a) can be provided on the end faces of the respective tip ends of the teeth (24) as viewed in the axial direction.

In general, the space located closer to the outer periphery than coils are will be often occupied with insulators and other parts, and it is difficult to secure a sufficiently wide wiring space there. For that reason, when such a conventional arrangement is adopted, the magnetic bearing tends to be oversized. In contrast, according to this embodiment, the magnetic bearing (20) can be configured to have a smaller size.

Although description of the displacement sensors (50) has been omitted for the sake of convenience of description as for this seventh embodiment, the displacement sensors (50) may also be arranged as in the sixth embodiment on the end faces of the tip ends of the teeth (24) as viewed in the axial direction so as to be located closer to the inner periphery than the coils (26) are, even when the coils (26) are wired together somewhere close to the inner periphery.

Other Embodiments

It should be noted that the respective side surfaces (S) of the teeth (24) that form each tooth pair (27) do not always have to be parallel to each other.

Also, the embodiment in which the width of an outer peripheral portion of each tooth is set to be different from that of an inner peripheral portion thereof (i.e., an embodiment in which the notch (24a) is provided) is only an example. Alternatively, the tooth width may be changed gradually so that the width increases little by little toward the outer periphery.

Furthermore, the magnetic bearing (20) does not always have to be applied to the turbo compressor (1). For example, the magnetic bearing (20) is also applicable to a turbomolecular pump and various other kinds of devices with a rotating shaft.

The shape of the base member (51) adopted in the sixth embodiment and other embodiments is only an example. The base member (51) may even be omitted.

INDUSTRIAL APPLICABILITY

The present invention can be used effectively as a magnetic bearing to support a rotating shaft with magnetic force.

DESCRIPTION OF REFERENCE CHARACTERS 20 magnetic bearing
13 drive shaft (rotating shaft)
22 stator core
22a core block
23 back yoke
24 tooth
26 coil
50 displacement sensor

The invention claimed is:

1. A magnetic bearing comprising:
a stator core in which a plurality of teeth are arranged in a circumferential direction so as to be located closer to an inner periphery than an annular back yoke is and to face a rotating shaft; and
coils wound around the respective teeth, wherein
a predetermined one of the teeth is configured so that a pitch between the predetermined tooth and one of two adjacent teeth that are located on clockwise and counterclockwise sides thereof in the circumferential direction is broader than a pitch between the predetermined tooth and the other tooth and that a magnetic flux flows in the same radial direction through the predetermined tooth and the tooth spaced from the predetermined tooth by the narrower pitch but in two different radial directions through the predetermined tooth and the tooth spaced from the predetermined tooth by the broader pitch, and
each tooth has, at a tip end thereof, a notched portion facing an adjacent tooth through which the magnetic flux flows in the same radial direction, and has, at the tip end, no notched portion facing another adjacent tooth through which the magnetic flux flows in a different direction, such that a circumferential width of an outer peripheral portion of each said tooth is broader than a circumferential width of an innermost peripheral portion thereof.

2. The magnetic bearing of claim 1, wherein the two teeth which are adjacent to each other and through which the magnetic flux flows in the same radial direction have their inner peripheral ends brought into contact with each other.

3. The magnetic bearing of claim 2, wherein the stator core is comprised of a predetermined number of core blocks which have been coupled together so that their boundary is defined by a portion of the back yoke.

4. The magnetic bearing of claim 3, wherein the two teeth which are adjacent to each other and through which the magnetic flux flows in two opposite radial directions have side surfaces that face each other in the circumferential direction and that are parallel to each other.

5. The magnetic bearing of claim 2, wherein the two teeth which are adjacent to each other and through which the magnetic flux flows in two opposite radial directions have side surfaces that face each other in the circumferential direction and that are parallel to each other.

6. The magnetic bearing of claim 2, wherein the coils are wound the same number of times around the two teeth which are adjacent to each other and through which the magnetic flux flows in two different radial directions.

7. The magnetic bearing of claim 1, wherein the stator core is comprised of a predetermined number of core blocks which have been coupled together so that their boundary is defined by a portion of the back yoke.

8. The magnetic bearing of claim 7, wherein the two teeth which are adjacent to each other and through which the magnetic flux flows in two opposite radial directions have side surfaces that face each other in the circumferential direction and that are parallel to each other.

9. The magnetic bearing of claim 1, wherein the two teeth which are adjacent to each other and through which the magnetic flux flows in two opposite radial directions have side surfaces that face each other in the circumferential direction and that are parallel to each other.

10. The magnetic bearing of claim 1, wherein the coils are wound the same number of times around the two teeth which are adjacent to each other and through which the magnetic flux flows in two different radial directions.

11. The magnetic bearing of claim 1, wherein a displacement sensor to sense any displacement of the rotating shaft is arranged closer to the inner periphery than the coils are so as to overlap with an axial end face of a tip end portion of each said tooth when viewed in an axial direction.

12. The magnetic bearing of claim 1, wherein predetermined ones of the coils are connected in series together by being wired together at a point closer to the inner periphery than the coils are on the axial end face of the tip end portion of each said tooth.

* * * * *